United States Patent [19]

Holyoak

[11] Patent Number: 4,702,198
[45] Date of Patent: Oct. 27, 1987

[54] BIRDHOUSE ASSEMBLY

[76] Inventor: Hugh K. Holyoak, P.O. Box 449, Alapaha, Ga. 31662

[21] Appl. No.: 792,899

[22] Filed: Oct. 30, 1985

[51] Int. Cl.$^4$ ............................................. A01K 31/00
[52] U.S. Cl. .................................................... 119/23
[58] Field of Search .............................. 119/23, 24, 26

[56] References Cited

U.S. PATENT DOCUMENTS

| | | | |
|---|---|---|---|
| 1,587,804 | 6/1926 | Stein | 119/23 |
| 1,916,878 | 7/1933 | Anklam | 119/23 |
| 2,944,515 | 7/1960 | Mura | 119/23 |
| 3,078,826 | 2/1963 | Bear | 119/23 |
| 3,792,685 | 2/1974 | Wiener | 119/23 |
| 3,818,868 | 6/1974 | Boehland, Jr. | 119/23 |
| 3,986,480 | 10/1976 | Vail | 119/23 |
| 4,140,081 | 2/1979 | Killmon | 119/23 |

Primary Examiner—Robert P. Swiatek
Attorney, Agent, or Firm—Newton, Hopkins & Ormsby

[57] ABSTRACT

A birdhouse for purple martins comprising a tubular enclosure having within a plurality of vertically stacked floors secured to at least one vertical partition forming at least two nesting compartments per tier, each compartment having an opening and a perch. Several enclosures are secured together by a hollow post having a vertical series of hooks mounted thereon to correspond to vertical series of brackets mounted to the back of the enclosure. The birdhouses are suspended from a pole high above the ground via a pulley system. The partition and the floors can be removed for easy cleaning by sliding out either the top or bottom of the enclosure. Alternatively, the birdhouse may be constructed by vertically stacking a series of identical interlocking units topped with a roof, wherein the nesting compartments are situated radially about a central opening which is adapted to slide axially onto a mounting sleeve.

15 Claims, 16 Drawing Figures

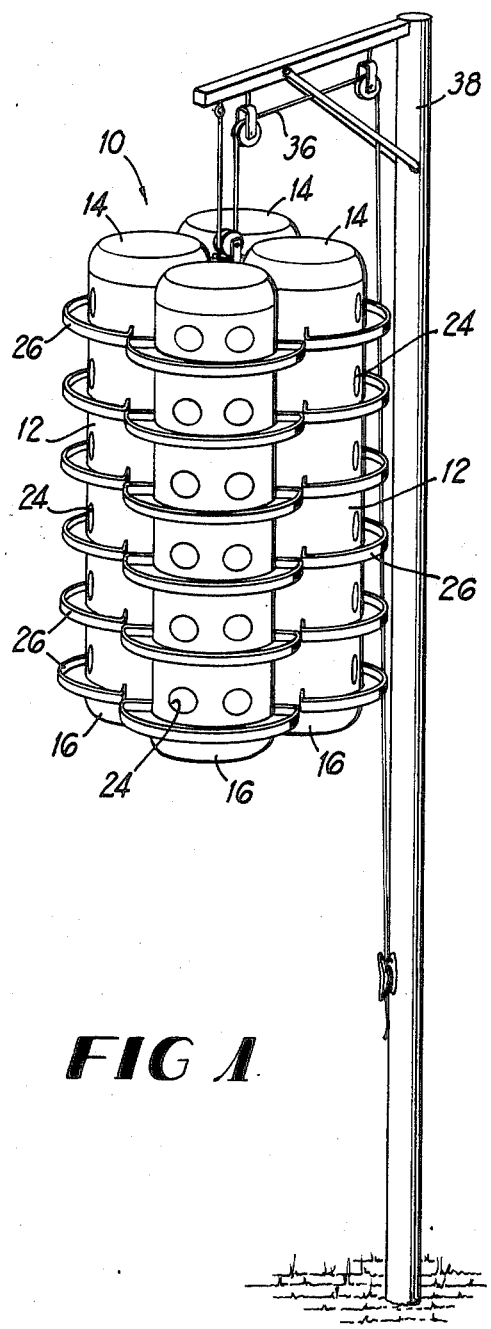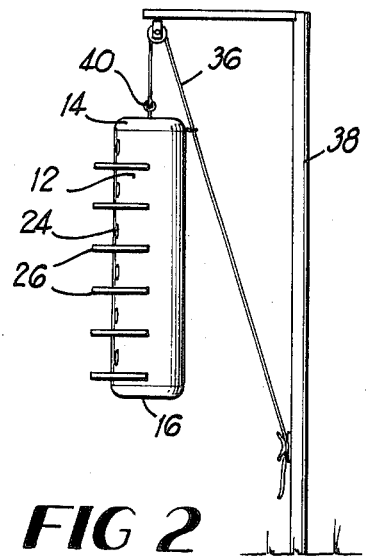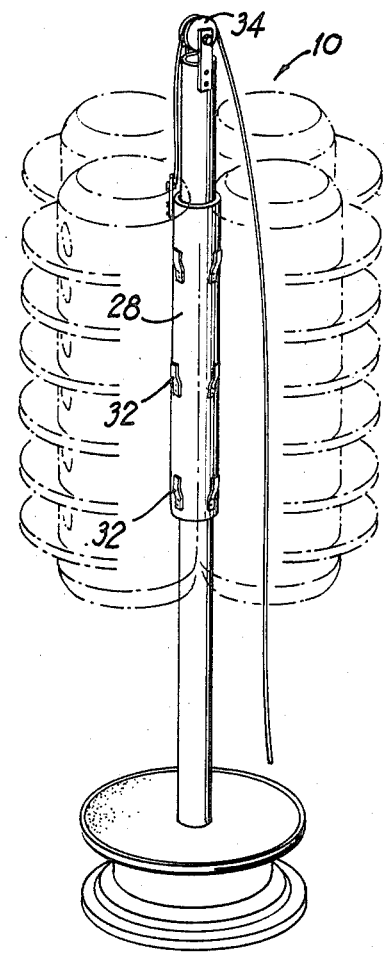
FIG 1
FIG 2
FIG 3

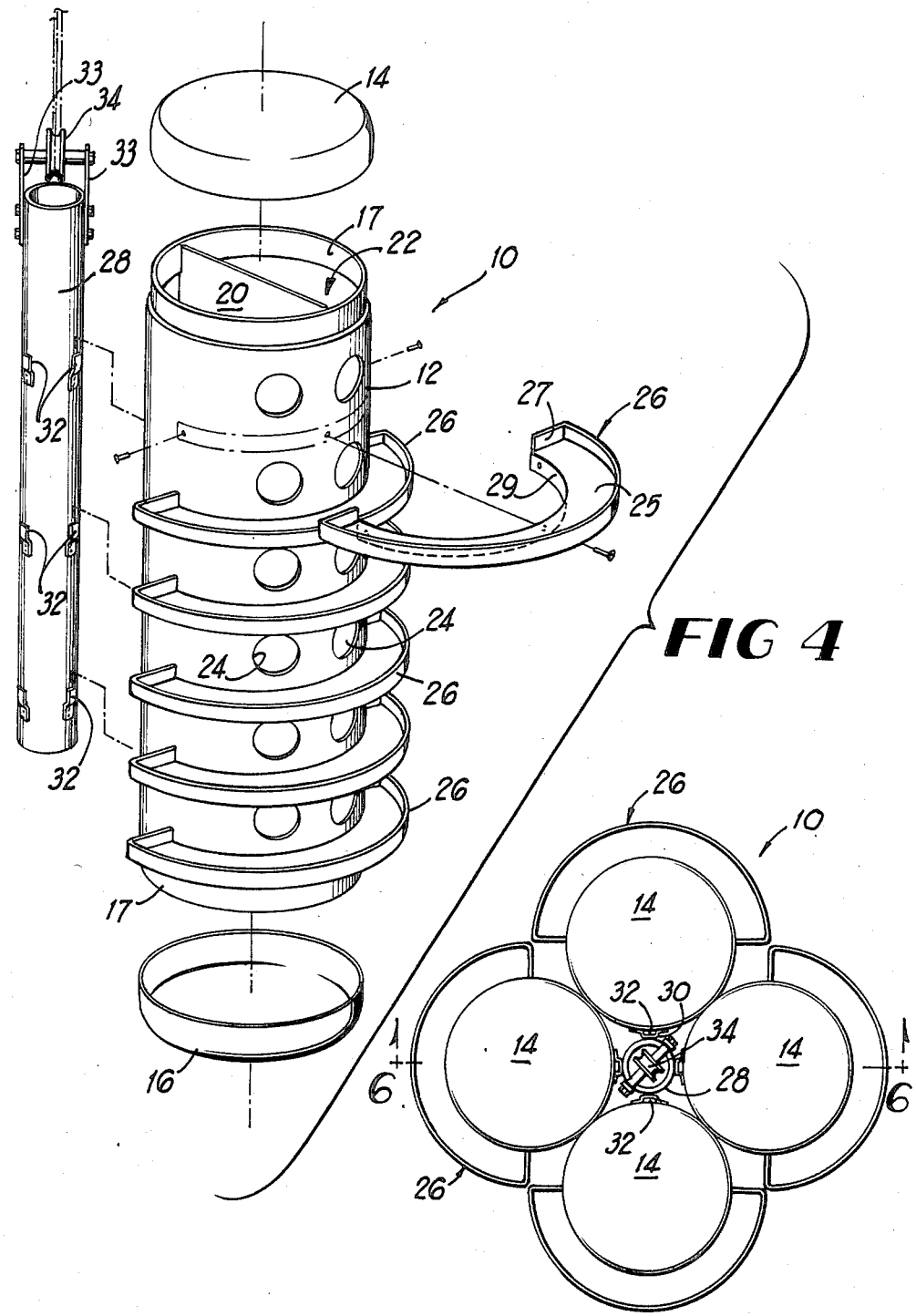

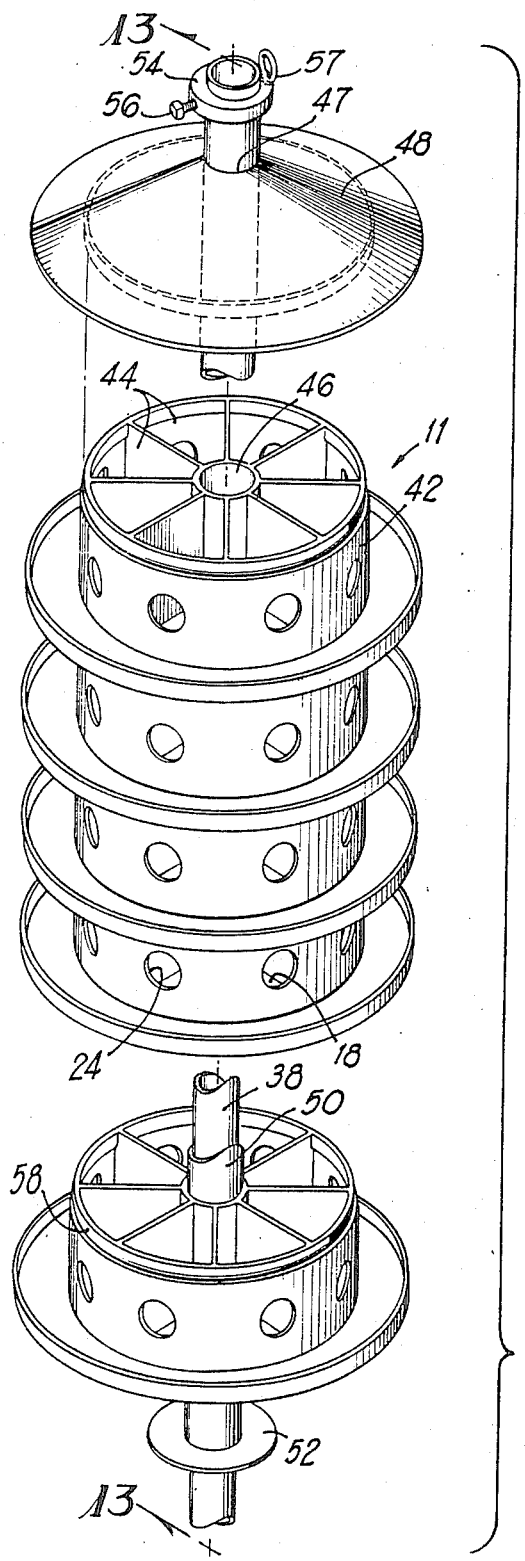
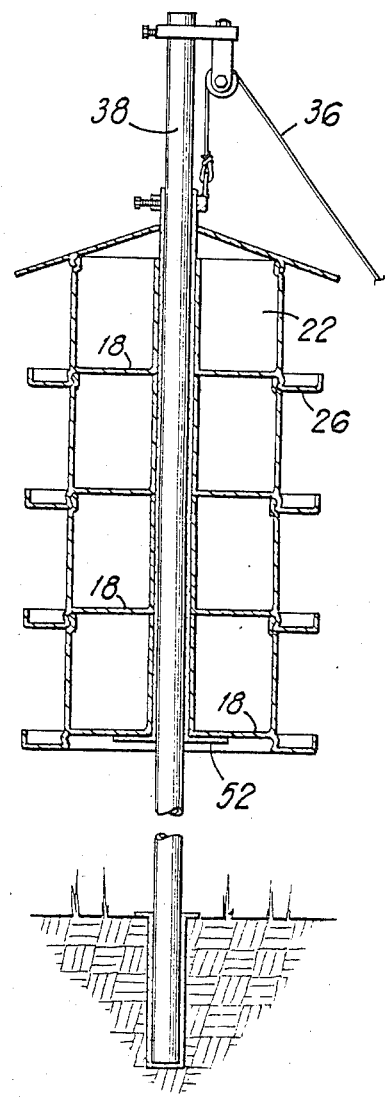
FIG 13
FIG 12

4,702,198

BIRDHOUSE ASSEMBLY

BACKGROUND OF THE INVENTION

This invention relates to birdhouses, more specifically this invention relates to birdhouses for purple martins.

The purple martin is fast becoming one of the most popular birds in the United States because of its voracious appetite for flying insects such as mosquitoes, flies, beetles, moths, and dragon flies. It has been observed that one purple martin may consume anywhere from 2,000-12,000 mosquitoes per day. Therefore, having several purple martin families in residence can virtually eliminate undesirable insects from the area. In addition to insect control, purple martins are entertaining to watch as they take their food and water on the wing and rear their young. Purple martins have social instincts and prefer to nest in groups in man-made birdhouses having multiple compartments. They are also fastidious and will select only scrupuluously clean nests. Further, it is important that enough nests be made available because purple martins travel in groups and if there is not enough room for all the birds to nest, they will continue to search for a nest that will accommodate the entire group.

The purple martin has many predators, such as squirrels, cats and snakes, thus, it is important that the martin birdhouse be inaccessible to these natural enemies. To that end, adequate protection must be assured by locating their nests high above the ground.

The above characteristics of the purple martin require that their houses have multiple compartments, be easy to clean, be mounted above the ground with relative ease, and be essentially maintenance free.

DESCRIPTION OF THE PRIOR ART

The birdhouses of the prior art are all very complicated structures having many individually crafted components. These birdhouses are time consuming and expensive to manufacture. For example, U.S. Pat. No. 3,696,792 to Bruhns discloses a birdhouse which provides a plurality of compartments and is telescopically mounted on a hollow post. The Bruhns birdhouse is also constructed to permit the introduction of water through the telescoping post and into the individual compartments via a series of openings. This type of birdhouse is very heavy and difficult to install and, because the complex mounting means has many separate parts, it is also expensive to maintain.

Therefore, a major objective of the present invention is to provide a multiple dwelling birdhouse which attracts purple martins and is also designed simply enough to be maintenance free, easy to clean and affordable.

SUMMARY OF THE INVENTION

The birdhouse of the present invention has a plurality of nesting compartments situated within a hollow tubular enclosure having a top and bottom cap. A plurality of vertically stacked spaced apart floors are situated horizontally and secured in a generally parallel relationship within the enclosure to at least one vertically disposed partition which extends between the top and bottom caps forming at least two compartments per tier. Each compartment is accessible to the outside via an opening in the side of the enclosure. Just outside the opening, a perch is attached to the exterior of the enclosure.

The birdhouse can be suspended on a pole above the ground by a rope and pulley system. In order to suspend a single enclosure, an eye bolt is attached to the top of the enclosure. When one wishes to suspend a cluster of enclosures, a hollow post is provided having a vertical series of hooks attached thereto and so positioned as to be able to slideably engage a vertical series of brackets attached to the exterior side of the enclosure. Generally, a cluster of four enclosures can be mounted on one hollow post, which is then connected to a pulley system whereby the cluster of enclosures can be raised easily high above the ground.

The perch consists of a platform having two flanges. The first flange extends upwardly along the outer periphery of the platform and functions as a railing. The second flange extends downwardly from along the inner periphery of the platform and is used for mounting the perch to the outside of the enclosure.

An alternate embodiment for the birdhouse is described when it is constructed having more than two compartments per tier. The alternate embodiment comprises a plurality of vertically stacked substantially identical interlocking units. Each unit has a divider situated therein for dividing the unit into a plurality of individual nesting compartments which are radially disposed about a central opening. A roof is adapted to cover the top of the uppermost unit, the roof having a central opening corresponding to and in alignment with the opening in each interlocking unit. An elongated mounting sleeve is axially received within the central opening of each unit and the roof. The bottom end of the sleeve has a stop means for supporting the bottom most unit. As described above for the first embodiment, each compartment is accessible to the outside via an opening through the exterior of the unit and each compartment has a perch attached to the unit in close proximity to the opening. The housing is axially mounted on a pole and attached to a pulley system for raising and lowering the birdhouse for easy cleaning.

BRIEF DESCRIPTION OF THE DRAWINGS

FIG. 1 is a perspective view illustrating a cluster of birdhouses of the invention suspended from a pole by means of a pulley system.

FIG. 2 is a side elevation illustrating a single suspended birdhouse.

FIG. 3 is a perspective illustrating a cluster of bird houses, in phantom, telescopically mounted on a pole.

FIG. 4 is a partially exploded perspective view of the invention.

FIG. 5 is a top plan view illustrating a cluster of four birdhouses.

FIG. 12 is a perspective view of an alternate embodiment of the invention.

FIG. 13 is a side elevational view in partial cross section taken along line 13—13 of FIG. 12.

DETAILED DESCRIPTION OF THE DRAWINGS

Figure 8:
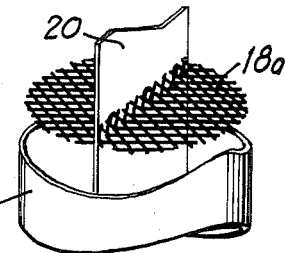
FIG. 8 is a detailed perspective view of an alternate embodiment of the floor of the invention.

Referring now to the drawings, FIG. 1 is a perspective view illustrating a cluster of four birdhouses 10 suspended from a pole 38 by means of a pulley system. Enclosure 12, as illustrated, is cylindrical in shape and is constructed of high density polyethylene plastic for year-round outside exposure. Top cap 14 and bottom cap 16 are constructed of the same high quality polyethylene and are molded to fit snugly over rims 17, as shown in FIG. 4. Top and bottom caps can be further secured by screwing or riveting each cap to rim 17.

Figures 6, 7:
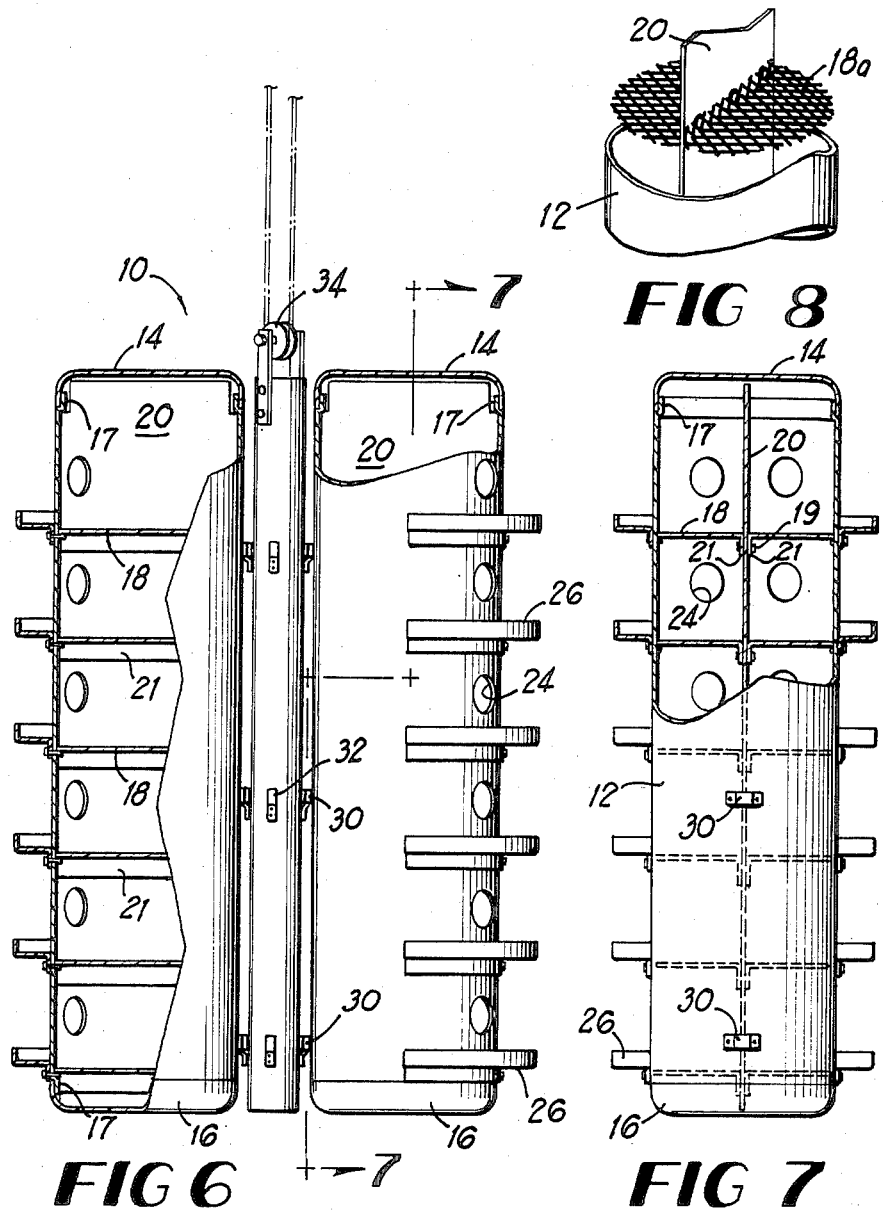
FIG. 6 is a side elevational view in partial cross section taken along line 6—6 of FIG. 5.
FIG. 7 is an elevational sectional view taken along line 7—7 of FIG. 6.

Referring now to FIG. 7, partition 20 is inserted lengthwise inside enclosure 12 dividing the interior into two spaces of equal size. Partition 20 is preferably constructed of flexible polyethylene so that it can be deformed slightly for easy insertion past rims 17. This type of material is essentially maintenance free and resists deterioration; however, other materials, such as plywood or metal, may be substituted. A plurality of floors 18 are detachably secured to partition 20 with rivets 19 that extend through floor flange 21 and partition 20. The intersection of floors 18 with partition 20 forms two nesting compartments 22 per tier. Floor flange 21 is illustrated as extending downwardly, however, it could also extend upwardly with equal facility. When enclosure 12 is cylindrical and constructed having six tiers in order to accommodate 12 purple martin families, a single partition is inserted and consequently the floors 18 are semi-circular in shape. Floor 18 of one compartment also serves as the ceiling of the compartment directly below. As illustrated in the preferred embodiment, floor $18_a$ is made of polyethylene or similar material and stacked far enough apart as to permit the martins to nest comfortably. An alternate embodiment is shown in FIG. 8 where floor $18_a$ is constructed of wire mesh.

Alternately, the floor and partition construction may consist of a single molded polyethylene insert (not shown) where each floor 18 is molded to partition 20. It can be appreciated that either type of construction can slide into and out of enclosure 12 easily from either the top or bottom opening, before the top and bottom caps are secured to rim 17.

In the preferred embodiment of FIG. 4, twelve nesting compartments 22 are defined within enclosure 12 by floors 18, partition 20, and the sides of enclosure 12. An opening 24 is situated as to provide the birds with ready access to each compartment. Openings 24 are attractively cut to form two vertical rows, each opening 24 being large enough to permit the martins to pass therethrough freely.

Each compartment has a perch 26 which protects the baby martins from falling while also providing a convenient place for the adults to land. Perch 26, as illustrated in FIG. 4, is of a patio type construction having a flat platform 25, an upperly extending flange 27, which serves as the guardrail, and a downwardly extending flange 29 having a plurality of holes for securing perch 26 to the exterior of enclosure 12. Platform 25 is crescent-shaped in order to fit flush against the exterior of enclosure 12.

As mentioned above, one of the major considerations in designing a purple martin birdhouse is that one should be able to clean the nesting compartments easily and frequently. This has been a particularly difficult problem for purple martin birdhouses because the martins prefer nests which are located high above the ground. One of the major advantages of the present invention is the ability to raise and lower housing 10 easily for frequent cleaning. In order to provide a convenient means for raising and lowering housing 10, an elongated hollow post 28 is provided, as shown in FIG. 4, having a series of hooks 32 mounted in a vertical line and positioned to slideably engage a series of brackets 30 (see FIG. 5) also mounted in a vertical line along the backside of enclosure 12. Three sets of hooks 32 and brackets 30 have been found to provide sufficient support for an enclosure having twelve nesting compartments. The number of brackets and their placement, of course, may vary according to the relative sizes of enclosure 12 and hollow post 28. Hollow post 28 is made of PVC pipe, generally corresponding in length to enclosure 12. Mounting hooks 32 are made of heavy duty aluminum and can be fastened firmly to post 28 with screws or rivets. Arms 33, also made of heavy duty aluminum, are attached to the top of hollow post 28, and are connected to wheel 34, as illustrated in FIG. 4. The manner in which a cluster of birdhouses 10 can be attached to pole 38 via rope 36 is shown in FIG. 1. As can be seen, birdhouses 10 can be raised and lowered for cleaning quite easily. When only a single birdhouse is being used, eye bolt 40 can be attached to enclosure 12 through top cap 14, as shown in FIG. 2.

An alternate means for mounting is shown in FIG. 3 where a cluster of birdhouses is erected on pole 38 in a telescoping fashion. The pole can be imbedded in concrete and placed either above or below ground.

Cleaning of birdhouse 10 is accomplished by lowering the entire unit to ground level, removing top cap 14 and sliding partition 20 and attached floors 18 upward until they clear the top of enclosure 12, at which position they can be liberally flushed with water. Or, if one prefers, bottom cap 16 can be removed and the insert can slide downward out the bottom of enclosure 12.

Figure 9:
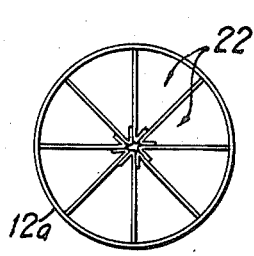
FIGS. 9-11 are schematized top plan views of alternate embodiments of the invention.
Figure 10:
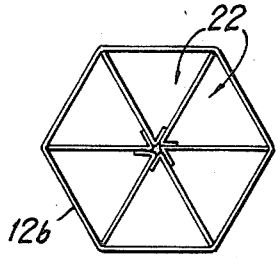
Figure 11:
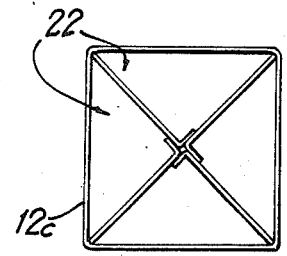

FIGS. 9–11 are schematized top plan views of alternate embodiments of birdhouse 10. As illustrated, enclosure $12_a$ can be circular having more than two compartments 22 per tier. If this is the case, the central partition 20 is eliminated and a plurality of vertical partitions are substituted, the number depending on the total number of compartments desired. For example, FIG. 9 illustrates eight compartments for each tier. FIG. 10 shows enclosure $12_b$ in the shape of a hexagon having six compartments for each tier and FIG. 11 shows a square-shaped enclosure $12_c$ having four compartments per tier.

When the birdhouse enclosure has more than two compartments per tier, as shown in FIGS. 9–11, it may no longer be feasible to mount the enclosures, as illustrated in FIGS. 1, 2, and 3. The embodiments illustrated in FIGS. 9–11 may be constructed having a central opening for slidably mounting the birdhouse on a pole. An alternate construction comprising a series of substantially identical interlocking units 42 is illustrated in FIGS. 12–15. In FIG. 12, birdhouse 11 is illustrated having five vertically stacked interlocking units 42, however, the number of units may vary according to preference. Each unit is molded separately of polyethylene or similar material, the exterior side of the unit, floor 18 and divider 44 being molded in one piece. Compartments 22, as formed by divider 44, are radially disposed about central opening 46. Roof 48 is adapted to cover the top of the uppermost unit and also has a central opening 47 which corresponds to and aligns with opening 46 of each unit. Units 42 are stacked by sliding on to elongated mounting sleeve 50, the bottommost unit resting on stop flange 52 which forms the bottom end of mounting sleeve 50. The top end of the mounting sleeve 50 is provided with a set collar 54, set screw 56, and eyelet 57 so that once the number of units desired are stacked in place and roof 48 is placed on top, the entire housing can be axially mounted on pole 38 and raised and lowered by attaching the housing to a pulley system via eyelet 57, as shown in FIG. 13.

Alternately, eyelet 57 can be replaced by arms 33, as shown in FIG. 4, and housing 11 suspended from pole 38, as illustrated in FIGS. 1 and 3.

The perch for the alternate embodiment can be molded as part of interlocking unit 42 or molded separately and attached, as indicated in FIG. 4, via a downwardly extending flange and corresponding rivets.

Interlocking units 42 are constructed having an inset rim 58 that projects upwardly and forms a flush fit with the unit directly above. Rim 58 may be smooth as illustrated in FIG. 12, or it may have additional structural features for securing units 42, as illustrated in FIGS. 14 and 15.

Figure 14:
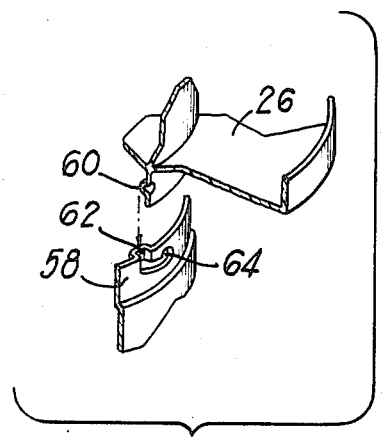
FIG. 14 is an exploded detailed perspective view of the embodiment of FIG. 12 showing a detent and groove means for securing the individual compartments together.
Figure 15:
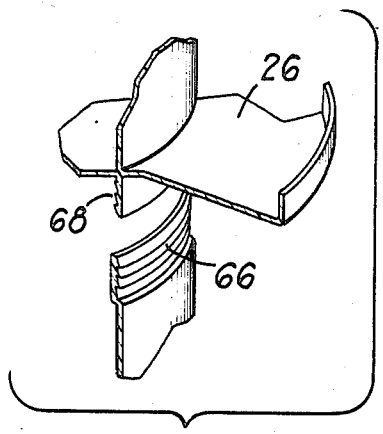
FIG. 15 is an exploded detailed perspective view of the embodiment of FIG. 12 showing a serrated clamp means for securing the individual compartments together.

FIG. 14 shows a detent 60 and locking groove 62 construction wherein detent 60 protudes into groove 62 and then as the upper unit 42 is rotated, detent 62 is forced downwardly by ramp 64 which has a slight downward slope. Alternatively, rim 58 may have external annular serrations 66 which are complimentary to internal annular serrations 68, as illustrated in FIG. 15.

Figure 16:
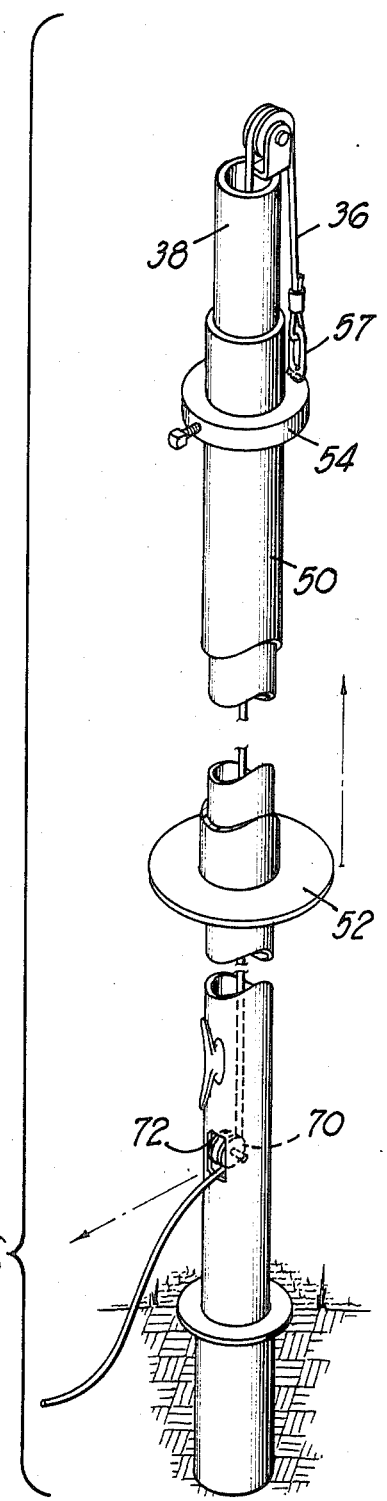
FIG. 16 is a perspective of an elongated mounting sleeve of the structure of FIG., 12 showing an internal pulley system.

FIG. 16 illustrates an internal pulley system, whereby rope 36 passes vertically through the center opening of pole 38, wraps around internal wheel 70, and exits out window 72. This type of system can be used for either housing 10 or alternate embodiment 11.

The birdhouse of the present invention has been found to be attractive to purple martins while providing a design offering many conveniences to the homeowner. It would be apparent that various changes and modifications may be made in construction and arrangement of the components within the sphere and scope of the invention. It is intended that such changes and modifications be included within the scope of the appended claims.

What is claimed is:

1. A housing for birds, particularly of the purple martin family comprising:
    a hollow tubular enclosure having a molded unitary body and a top and a bottom cap;
    a plurality of vertically stacked spaced apart floors situated horizontally and secured in a generally parallel relationship within the enclosure;
    at least one planar partition running axially along a radial plane extending between the top and bottom cap and from one inside surface to one diametrically opposed surface and being attached to and intersecting the floors;
    a plurality of nesting compartments situated within the enclosure, defined by the floors, a portion of the at least one partition, and the inside surface of the enclosure, each compartment being accessible to the outside via an opening in the side of the enclosure;
    a perch for each compartment attached to the enclosure in close proximity to the opening; and
    a means for suspending the birdhouse above the ground.

2. The invention of claim 1 wherein the means for suspending the birdhouse above the ground further comprises means for raising the lowering the birdhouse.

3. The invention of claim 2 wherein the suspending means comprises a pulley system having a rope and at least one wheel for connecting the birdhouse to a pole.

4. The invention of claim 3 wherein an eye bolt is mounted to the top cap for attachment to the rope of the pulley system.

5. The invention of claim 2 wherein the suspending means comprises the birdhouse having a vertical series of brackets attached to the exterior side of the enclosure and a hollow post having a corresponding vertical series of hooks attached to the exterior side of the post, the hooks being so aligned as to slideably engage the brackets mounted to the enclosure.

6. The invention of claim 5 wherein the hollow post has more than one vertical series of brackets in order to permit a cluster of enclosures to be mounted thereto.

7. The invention of claim 6 wherein the suspending means comprises a pulley system having a rope and at least one wheel for connecting the cluster of birdhouses to a pole.

8. The invention of claim 7 wherein two arms connect the top of the hollow post to the at least one wheel of the pulley system.

9. The invention of claim 1 wherein the perch comprises a platform having two flanges, the first flange extending upwardly along the outer periphery of the platform and the second flange extending downwardly along the inner periphery of the platform.

10. The invention of claim 1 wherein the floor is constructed of mesh.

11. A housing for birds, particularly of the purple martin family comprising:
    a cluster of hollow tubular enclosure, each enclosure having a molded unitary body and a top and bottom cap, at least one partition running axially along a radial plane extending between the top and bottom cap and from one inside surface to one diametrically opposed surface, and a plurality of compartments situated therein, each compartment defined by a floor, a ceiling, a portion of the at least one partition, and the inside surface of the enclosure, each compartment being accessible to the outside via an opening in the side of the enclosure;
    a perch for each compartment attached to the exterior of the enclosure in close proximity to the opening; and
    a means for securing the cluster of enclosures together.

12. The invention of claim 11 wherein the floor of one compartment forms the ceiling of the compartment directly below.

13. The invention of claim 11 wherein the securing means comprises each enclosure having a vertical series of brackets attached to the exterior side of the enclosure and a hollow post having a corresponding vertical series of hooks attached thereto and so positioned to slideably engage the brackets mounted to the enclosure.

14. The invention of claim 13 wherein four enclosures are secured to the hollow post.

15. The invention of claim 11 wherein the floor is constructed of mesh.

* * * * *